US007770125B1

(12) United States Patent
Young et al.

(10) Patent No.: US 7,770,125 B1
(45) Date of Patent: Aug. 3, 2010

(54) METHODS AND APPARATUS FOR AUTOMATICALLY GROUPING GRAPHICAL CONSTRUCTS

(75) Inventors: Jeffery Young, San Jose, CA (US); Jean L. Brousseau, Gatineau (CA)

(73) Assignee: Adobe Systems Inc., San Jose, CA (US)

( * ) Notice: Subject to any disclaimer, the term of this patent is extended or adjusted under 35 U.S.C. 154(b) by 1570 days.

(21) Appl. No.: 11/059,620

(22) Filed: Feb. 16, 2005

(51) Int. Cl.
G06F 15/00 (2006.01)
G06F 17/00 (2006.01)
G06F 3/00 (2006.01)
G06F 9/00 (2006.01)

(52) U.S. Cl. .................. 715/764; 715/837; 715/835; 715/810; 715/769; 715/770

(58) Field of Classification Search .......... 715/837, 715/835, 810, 764, 769, 770, 700

See application file for complete search history.

(56) References Cited

U.S. PATENT DOCUMENTS 4,700,317 A * 10/1987 Watanabe et al. ............. 706/45
5,555,369 A * 9/1996 Menendez et al. .......... 715/762

* cited by examiner

*Primary Examiner*—Kieu Vu
*Assistant Examiner*—Sabrina L. Greene
(74) *Attorney, Agent, or Firm*—Chapin IP Law, LLC

(57) ABSTRACT

In an application that uses a graphical user interface, a technique for automatically grouping graphical constructs receives a selection of a graphical construct for placement within a group of graphical constructs within a graphical work area of a graphical user interface. The system detects an existing group of graphical constructs already defined in a group and graphically displays an automatic grouping indicator that identifies, to a user of the graphical user interface, that the selected graphical construct can be automatically grouped within the existing group. The system receives, from the user, a selection of the existing group of graphical constructs that has an automatic grouping indicator displayed, and in response, automatically groups the selected graphical construct into the selected existing group of graphical constructs that has an automatic grouping indicator displayed on the graphical user interface.

23 Claims, 7 Drawing Sheets

METHODS AND APPARATUS FOR AUTOMATICALLY GROUPING GRAPHICAL CONSTRUCTS

BACKGROUND

Conventional computer systems that operate software applications designed for interaction with users often provide a graphical user interface enabling such interaction. Conventional graphical user interfaces often provide users with a variety of mechanisms for interacting with the software application that executes within the computer. As an example, a typical graphical user interface provides the ability for a user to operate an input mechanism such as a keyboard and/or mouse to graphically maneuver a pointing or selection mechanism within the interface in order to interact with different types of graphical constructs. Graphical constructs can include, for example, a scroll bar allowing a user to scroll through regions of text or other content displayed within a window in relation to the scroll bar. Other types of graphical constructs include selection mechanisms, text boxes, slider bars, graphical buttons and the like that allow a user to provide various types of input for use by the software application during execution. Applications use conventional graphical user interfaces to provide input to the software application for subsequent processing, or alternatively, applications provide graphical user interfaces to display forms that a user can complete and print in hardcopy.

In some instances, the graphical user interface of a software application can provide graphical constructs that are arranged in or associated together within a group. As an example, one type of user selectable graphical construct is referred to as a radio button and generally, a radio button is often arranged within a group of radio buttons presented to the user within the graphical user interface. The radio button group allows the user to select one of the radio buttons to provide input to the graphical user interface (i.e., to the software application) on behalf of the related group of radio buttons. In other instances, a group of radio buttons allows a user to select one of multiple options for input into the software application.

As a specific example of grouping using radio buttons, suppose a graphical user interface is designed to obtain information about a user that is providing input into the software application to complete an electronic form displayed on the graphical user interface. The information to retrieve from user might include marital status, income level, educational level, and so forth. For many of these types of input, the graphical user interface might provide a respective radio button group within which the user can select a particular button of each group in order to provide a value associated with that button in the response to a question associated with the group. By way of example, a group of radio buttons for income level might provide individual user selectable radio buttons corresponding to different income levels (e.g., $0-$10,000, $10,001-$30,000, $30,001-$60,000, etc.). Upon a user selection of one of the radio buttons corresponding to an income level within the group, that radio button will return the value associated with the selected income level to the software application on behalf of that group of radio buttons.

Development of software applications that provide such graphical user interfaces can be a complex process. Software developers typically create graphical user interfaces by using a graphical user interface design and development application or tool, sometimes referred to as a GUI-builder, toolkit, or graphical form creator. Such graphical user interface development applications typically provide a graphical user interface that contains a palette of graphical widgets such a icons that represent various types of graphical constructs that a user can select and arrange within a development area that contains a graphical user interface under construction by the developer. The developer can use his or her input device to select desired graphical constructs and can drag and drop those constructs from the palette of available constructs onto the development area in order to graphically create a new graphical user interface or form. Thus if the developer desires to add a text box to the graphical user interface under construction, the developer can select a graphical construct or widget representing a text box from the palette of available graphical constructs and can drag and drop the text box widget (i.e., an icon) onto the development area to a desired location. Other types of graphical constructs such as scroll bars, borders, headers, buttons, lists, pull down menus and the like can be similarly selected and dragged and dropped onto the development area in order to construct the desired look and feel of the graphical user interface under construction.

In conventional graphical user interface development applications (that can include both software application development tools and form builder-type applications), creation of groups of graphical constructs allows the user to define a group of constructs by name and then specify individual graphical constructs that are to be part of that group. This process includes selection of an individual construct to be part of a group and configuring a set of group options to be associated with that selected individual graphical construct. This process is repeated for each construct added to the group. If the selected individual construct is the first member of a group of constructs to be created, a user can specify a group name for the new group of constructs. Additionally, the user can specify group options to be associated with that individual graphical construct to be added to the group. Group options that must be specified for each construct added to the group can include, for example, a look and feel of that graphical construct within the group, a visually displayed name or title associated with that graphical construct within the group, a value to be returned by the graphical construct (e.g., if the graphical construct is part of, for example, a radio button group) and other information. Once the group options associated with a selected graphical construct to be added to the group are completed, the user can position the graphical construct having the specified group options within the development area in relation to other constructs that might have been previously added to the group. This can include manually aligning the position of the newly added construct to in relation to the existing constructs in the group if there is a pattern (e.g,. horizontal or vertical arrangement) to the constructs in that group.

In this manner, conventional graphical user interface development applications allow grouping of graphical constructs. Examples of conventional software applications that provide such grouping mechanisms include Microsoft Corporation's "Dev studio," manufactured by Microsoft Corporation of Redmond, Wash., U.S.A., which is a development application that enables developers to create graphical user interfaces and forms using mechanisms as explained above.

SUMMARY

Conventional mechanisms and techniques that operate within graphical user interface development applications that enable developers to create graphical user interfaces and/or forms that support grouping of graphical constructs suffer from a variety of deficiencies. For example, in Microsoft's Dev studio, the developer must perform a number of cumbersome and cryptic operations in order to create a radio button group. For a particular radio button, the user must designate a radio button group to which that button is to belong and must manually set a number of a group options for that button that are located within a different regions of the graphical user interface of the development application. In addition, in Microsoft's Dev studio the value associated to the radio button is either on or off and the user must specify or manually position the location of that radio button within the development area. Further still, there is no mechanism to automatically identify any existing groups to which that radio button may be added while the new radio button is selected and being placed into the development area. Accordingly, the process of creating a group of radio buttons within conventional development applications is quite time-consuming for a user.

By contrast, embodiments of the invention significantly overcome these and other limitations related to the creation of groups of graphical constructs for use in graphical user interface or forms by a development application. In particular, configurations described herein provide mechanisms and techniques for automatically grouping graphical constructs within a graphical user interface thereby reliving the user of much of the manual effort of grouping such constructs. Configurations as explained herein operate within an application that uses a graphical interface, such as a development tool, software development toolkit, GUI-builder, form builder or similar development application program. Generally, configurations explained herein provide a grouping application and process that enables a user of such a development application to provide a selection of a graphical construct for placement within a group of graphical constructs within a graphical work area of the graphical user interface. The selected graphical construct may be, for example, a radio button or other graphical object to be placed in a group within a graphical user interface or form that is under construction by the developer within the development tool. The grouping process as explained herein is capable of automatically detecting existing groups of graphical constructs that may be already defined within the graphical work area and is able to automatically and graphically display an automatic grouping indicator that visually identifies, to the user of the graphical user interface, that the selected graphical construct (e.g., the radio button selected for placement within a group) can be automatically grouped within an existing group of graphical constructs defined within the work area.

As an example, if the user selects and graphically maneuvers (i.e., drags using a mouse pointer) a radio button icon onto the work area of the graphical user interface, and if during the graphical maneuvering the icon passes within a predetermined distance of another graphical construct that is already a member of an existing group of radio buttons, configurations as explained herein are able to provide a visual indication to the user that he or she may automatically associate the selected radio button being dragged to the nearby identified existing group of radio buttons by terminating the drag of the radio button. The user can then release the selected graphical construct and the configuration will automatically perform processing to add this construct into the group for which the automatic grouping indicator is displayed.

The visual indication provided by the automatic grouping indicator may be any type of graphical modification provided to the user that indicates that the selected graphical construct can be automatically joined to the existing group of graphical constructs. As an example, configurations disclosed herein can visually modify a graphical representation of the existing group of graphical constructs (or only some constructs within the group, such as the construct closest to the icon being moved by the user for addition into a group) within the work area, such as by graphically highlighting a background area of color of one or more constructs in the existing group, or by modifying a border or selection point(s) associated with existing grouped constructs. The visual modification is performed in real-time for each existing group as the user moves the selected construct icon about the work area in order to indicate to the user that a construct nearby the selected graphical construct is part of a group to which the selected graphical construct can be automatically joined.

Accordingly, in one configuration, as the user graphically maneuvers an icon representing a selected graphical construct within the work area of the graphical user interface, existing groups of graphical constructs that have been previously defined can be automatically visually identified during the movement process, such as when the moving icon comes within a predetermined distance to any constructs within an already existing group, to indicate to the user that the construct that he or she is moving can be automatically joined as a member of that group simply by releasing the icon selection at that time (i.e., while the visual indication is present). In an alternative configuration as will be explained, the user operating the development application can provide a "show available groups" selection in conjunction with the selection of the graphical construct in order to identify those available groups to which the selected graphical constructs can be joined.

As an example, in one configuration the user is able to "right-click" on the graphical construct within the palette of graphical constructs. Such an operation activates the show available group selection and causes configurations disclosed herein to identify and display a list of existing groups of graphical constructs that exist in the graphical work area to which the selected graphical construct can be added. Within the list, such configurations display a group selector that allows the user to select one or more of such groups into which to automatically add the selected construct. As an example, the first group within the pull-down menu can be highlighted to indicate a default group selection within the menu. The configuration can receive user input associated with the group selector to move the group selector within the list to select at least one existing group of graphical constructs to which the newly selected graphical constructs is to be joined.

According to configurations disclosed herein, once the user has associated a selection of a graphical constructs with an existing group of graphical constructs already defined within the work area of graphical user interface under construction (eitherh by releasing the icon selection or using the pull-down menu technique), the grouping process is able to automatically add the newly selected graphical construct into the existing group while maintaining graphical layout patterns and/or current value patterns of graphical constructs already associated with the existing group, and in some cases without requiring further manual effort or input by the user. As an example, consider the case of grouping radio buttons, each of which is required to have an associated value defined within the group to be returned to the application during operation of the interface after completion. In addition, such radio buttons may require placement within a graphical layout pattern of the group, such as being spaced evenly in a horizontal or vertical manner. According to configurations disclosed herein, if the user selects a radio button and selects a group to which that button is to be automatically added, configurations disclosed herein are able to identify any current graphical layout pattern(s) of the graphical constructs already associated with the existing group. Based on the current layout pattern, the automatic grouping process is able to graphically position the new graphical construct into the current graphical layout pattern while continuing to maintain the current graphical layout pattern.

Likewise, other configurations disclosed herein are able to identify a current value pattern of a sequence of values that are to be returned from graphical constructs already associated with existing groups of graphical constructs. Based on the current value pattern, the grouping process can calculate the next value within the current value pattern that maintains a sequence of values and can associate the next value to the new graphical construct that has been automatically added to the selected existing group of graphical constructs. In this manner, by identifying layout and value patterns and automatically assigning a layout position and value to the new graphical construct, embodiments of the invention significantly reduce the amount of time it takes for a user to add the new construct to the existing group of constructs.

By providing automatic grouping of constructs within existing groups of graphical constructs in a graphical user interface or form development tool, configurations disclosed herein provide significant decreases in amounts of time required to create groups of graphical objects and add other objects into such groups.

Other embodiments of the invention include any type of computerized device, workstation, handheld or laptop computer, or the like configured with software and/or circuitry (e.g., a processor) to process any or all of the method operations disclosed herein. In other words, a computerized device or a processor that is programmed or configured to operate as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

It is to be understood that the system of the invention can be embodied strictly as a software program, as software and hardware, or as hardware alone such as within a processor, or within an operating system or a within a software application. Example embodiments of the invention may be implemented within products and/or software applications manufactured by Adobe Systems, Inc. of San Jose, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
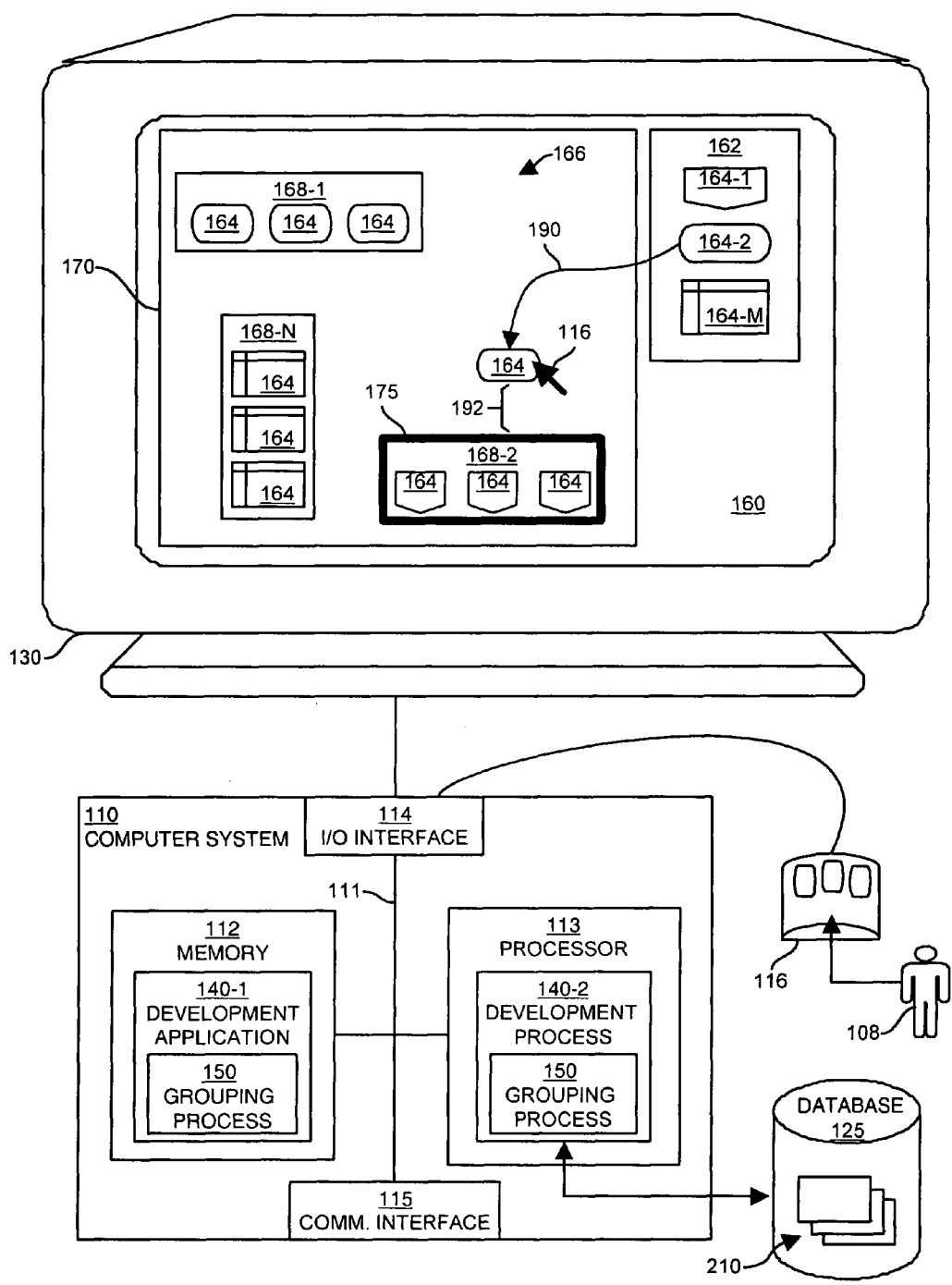
FIG. 1 is a block diagram of a computer system configured with a development application including a grouping process in accordance with one embodiment of the invention.

FIG. 1 is a block diagram illustrating example architecture of a computer system 110 that executes, runs, interprets, operates or otherwise performs a development application 140 and process 141 that include a grouping process 150 suitable for use in explaining example configurations of the invention. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, etc.) couples to processor 113 through I/O interface 114 and enables a user 108 such as a graphical user interface or forms developer (e.g., a graphical user interface designer) to provide input commands and generally control the graphical user interface 160 that the development application 140-1 and process 140-2 provides on the display 130. Also in this example configuration, a database 125 stores graphical user interfaces or forms 180 developed in accordance with techniques described herein within a computer readable medium. The communications interface 115 enables the computer system 110 to communicate with other devices (i.e., other computers) on a network (not shown). This can allow access to the development application by remote computer systems.

The memory system 112 is any type of computer readable medium and in this example is encoded with a development application 140-1 that includes a grouping process 150 that supports generation, display, and implementation of functional operations of the graphical user interface 160 as explained herein. The development application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the development application 140-1. Execution of development application 140-1 in this manner produces processing functionality in a development process 140-2. In other words, the development process 140-2 represents one or more portions or runtime instances of the development application 140-1 (or the entire application 140-1) performing or executing within or upon the processor 113 in the computerized device 110 at runtime. The grouping process 150 is included in this processing and operates as explained herein to provide automatic grouping of graphical constructs within the graphical user interface 160.

Generally, the graphical user interface 160 includes a palette 162 of user selectable graphical constructs 164 that can be selected and positioned (e.g., dragged and dropped) onto a graphical work area 170 for placement within a form or other graphical user interface 166 under development by the user 108. An example of a selectable graphical construct 164 is a radio button that can be dragged from the palette 162 using the input device 116 onto the graphical work area 170 for positioning within the graphical user interface 166 under development. Other examples can include any type of graphics widget or icon that represents a graphic can be placed in a graphical user interface such as a scroll bar, text box, border, line field, graphic, image, button, input field, list, menu or the like.

In this illustrated example, to the graphical work area 170 includes a plurality of existing groups of graphical constructs 168-1 through 168-N that each include one or more existing graphical constructs 164 that have been placed by the user within the graphical work area 170. The existing groups of graphical constructs 168 may be, for example, radio button groups in which each individual graphical construct 164 within a particular group 168 has an associated value that would be returned if that particular selected radio button 164 were selected within the group 168 during operation of the graphical user interface 166 (i.e., during runtime operation of the graphical user interface 166 that is now being developed by the developer 108).

Generally, and as will be explained in more detail shortly, configurations of the grouping process 150 allow the user 108 to select a graphical construct 164 from the palette 162 and automatically associate the selected graphical construct with an existing group of graphical constructs 168 within the graphical work area 170. The grouping process 150 enhances the user experience of grouping graphical constructs by significantly streamlining the process and eliminating user frustration, thereby shortening the overall time of development required to create the user interface or form 166. Further details of this processing will be explained shortly in the flow charts of processing steps that described details of operation of the grouping process 150.

It is noted that example configurations disclosed herein include the development application 140-1 itself including the grouping process 150 (i.e., in the form of un-executed or non-performing logic instructions and/or data). The development application 140-1 may be stored on a computer readable medium (such as a floppy disk), hard disk, electronic, magnetic, optical or other computer readable medium. The development application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the development application 140-1 in the processor 113 as the development process 140-2 including the grouping process 150. Those skilled in the art will understand that the computer system 110 may include other processes and/or software and hardware components, such as an operating system not shown in this example.

A display 130 need not be coupled directly to computer system 110. For example, the development application 140-1 can be executed on a remotely accessible computerized device via the network interface 115. In this instance, the graphical user interface 160 may be displayed locally to a user of the remote computer and execution of the processing herein may be client-server based.

Figure 2:
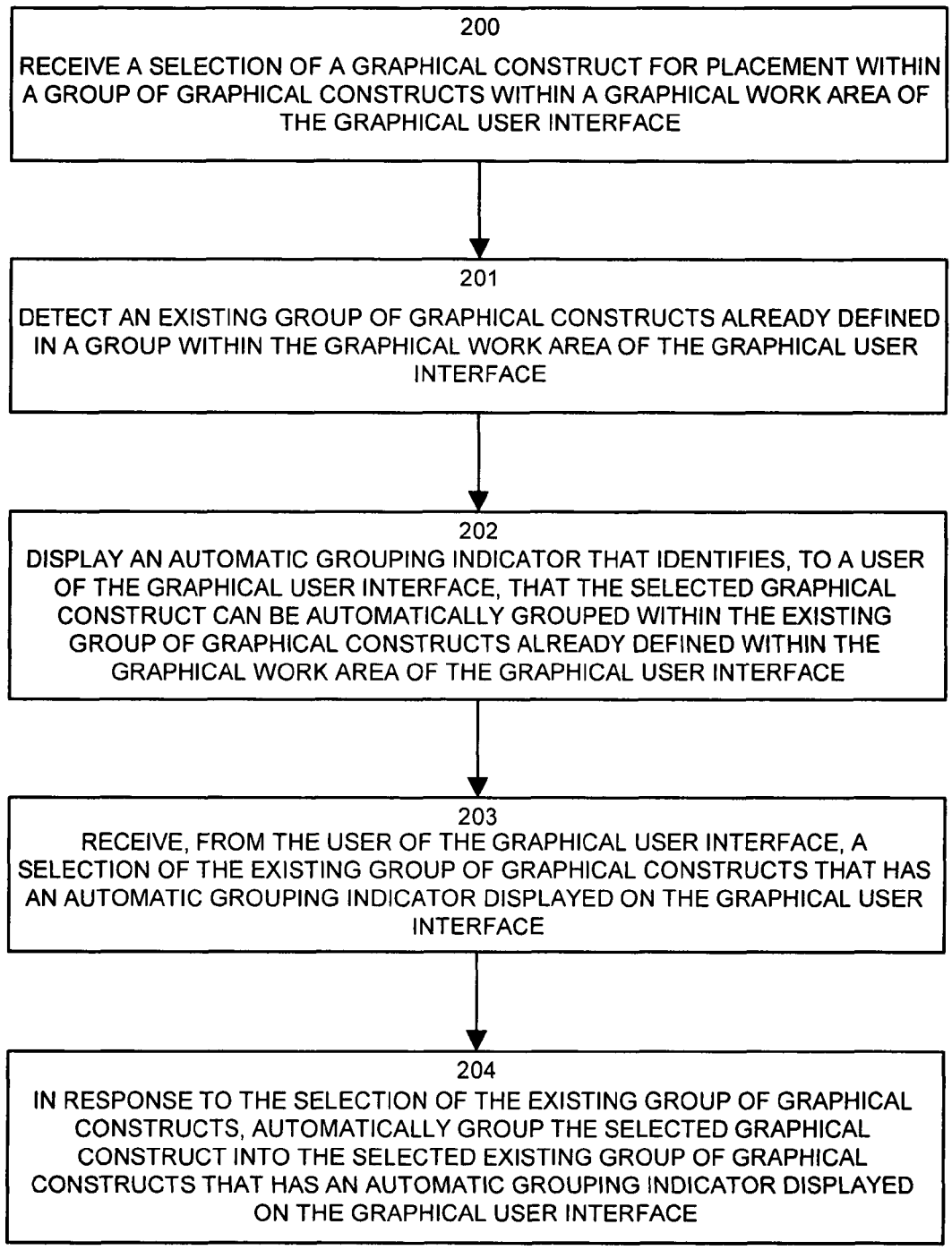
FIG. 2 is a flow chart of processing steps that shows high-level processing operations performed in accordance with one example configuration of the invention.

FIG. 2 is a flow chart of processing steps that a configuration of the grouping process 150 operating in an application or process 140 that uses a graphical user interface 160 performs for automatically grouping graphical constructs 164 in the graphical user interface 160 (i.e., within a form or interface 166 under development).

In step 200, the grouping process 150 receives a selection of a graphical construct 164 for placement within a group of graphical constructs 168 within a graphical work area 170 of the graphical user interface 160. Assume for this example description that the selected graphical construct 164 is a radio button to be grouped with one or more other radio buttons within the graphical work area 170. Further assume that the user 108 has already created at least one existing group of graphical constructs 168 within the graphical work area 170 prior to description of this example processing.

In step 201, in response to the user selecting the graphical construct 164, the grouping process 150 detects an existing group of graphical constructs 168 already defined in a group within the graphical work area 170 of the graphical user interface 160. As will be explained in more detail, detection of existing groups of graphical constructs 168 can include detecting the proximity of movement of an icon representing the user selected graphical construct 164, as the user drags the icon within the graphical work area 170, to any existing groups of graphical constructs 168 that may be present within the graphical work area 170. If the proximity to an existing group 168 is close enough, processing proceeds to step 202. In an alternative configuration, detection of existing groups of graphical constructs can be performed when the user selects the graphical construct 164 within the palette 162 for example, by the user specifying a show available groups selection option that results in presentation of a list, such as a pull down menu, scroll list or the like that identifies existing groups of graphical constructs 168 to which that selected graphical construct 164 can be added as a member. Further details on these embodiments will be explained shortly.

In step 202, in response to identifying one or more existing groups 168 to which the selected construct 164 could be added, the grouping process 150 graphically displays an automatic grouping indicator 175 that identifies, to a user of the graphical user interface, that the selected graphical construct 164 can be automatically grouped within the existing group of graphical constructs 168 already defined within the graphical work area 170 of the graphical user interface 160. Using the proximity example from above, as the user 108 maneuvers the graphical construct 164 within the graphical work area 170 for placement within the graphical user interface 166 under development, if the proximity of the graphical construct 164 comes within a predetermined distance of an existing group of graphical constructs 168 to which that graphical construct 164 can be automatically added, the grouping process 150 dynamically and automatically provides the automatic grouping indicator 175 that provides a graphical indication to the user that that automatic grouping is available. The automatic grouping indicator 175 graphically (i.e., visually) modifies the existing group of graphical constructs 168 to which the selected graphical construct 164 can be added in some manner, thus indicating to the user 108 that he or she can take advantage of operations of the grouping process 150 to perform automatic grouping of the user selected graphical construct 164. In the example, the border 175 of the identified group 168-2 is highlighted to show the user that the selected construct 164 could be added to this group if he or she chooses to do so.

In an alternative pull-down menu configuration (shown in FIG. 6, to be explained later), the user provides the shown available groups selection and a pull down menu or other type of list appears (to be discussed in relation to FIGS. 6 and 7) and the user is able to select one or more existing groups of graphical constructs 168 to which the selected graphical construct 164 can be automatically added.

In step 203, the grouping process 150 receives, from the user 108 of the graphical user interface 160, a selection of the existing group of graphical constructs (e.g,. 168-2 in the illustrated example) that has an automatic grouping indicator 175 displayed on the graphical user interface 160 (i.e., within the work area 170 as shown in this example). In the proximity example, the user 108 can simply release (via input device 116) the selection of the graphical construct 164 while the automatic grouping indicator 175 is concurrently displayed in order to have the selected graphical construct 164 be automatically grouped with the existing group(s) of graphical constructs 168 to which the automatic grouping indicator 175 applies.

In step 204, in response to the selection of the existing group of graphical constructs (e.g., 168-2), the grouping process 150 automatically groups the selected graphical construct 164 into the selected existing group of graphical constructs 168-2 that has an automatic grouping indicator 175 displayed on the graphical user interface 160. Automatic grouping can include, as will be explained, automatic placement of the selected graphical construct 164 within the selected existing group 168 for which the automatic grouping indicator 175 was displayed while maintaining layout and value patterns of existing graphical constructs within that group 168-2. As an example, if the vertical or horizontal spacing of graphical constructs 164 within the selected existing group 168 is approximately even, or conforms to some other identifiable pattern (e.g., is diagonal, or is incrementally increasing or decreasing in distance, etc.), the grouping process 150 can automatically detect this pattern and position the selected graphical construct 164 as an additional construct 164 within the existing group 168 while maintaining the approximate horizontal or even spacing or other pattern of the graphical layout already existing within the group 168-2.

In another configuration that will be explained shortly, the grouping process 150 can determine a pre-existing pattern of sequence values assigned to the respective graphical constructs 164 within the selected group 168-2 and can calculate a new value that conforms to existing value sequence and can automatically assign the new value to the graphical construct 164 while automatically adding that construct 164 to the existing group 168. Such sequence values can include return values to be associated with each construct (e.g., a radio button return value) as well as displayed title values assigned to each button that are displayed within the graphical user interface 166 that is under development). In other words, the grouping process 150 can identify any type of value data associated with constructs 164 in a group 168 that substantially conforms to a preexisting pattern and can then assigns such values to equivalent characteristics or value fields associated with the newly added construct so that the user does not need to supply this data when adding the construct to the group 168. Further details of these and other aspects of configuration as disclosed herein will now be provided with respect to the flow chart of processing steps in FIGS. 3 to 5.

Other configurations of the grouping process 150 allow the addition of the selected construct 164 to multiple selected groups (e.g., 168-2 . . . 168-N), and the layout and value patterns of each group can be identified and maintained and thus minimal further input is required by the user.

Figure 3:
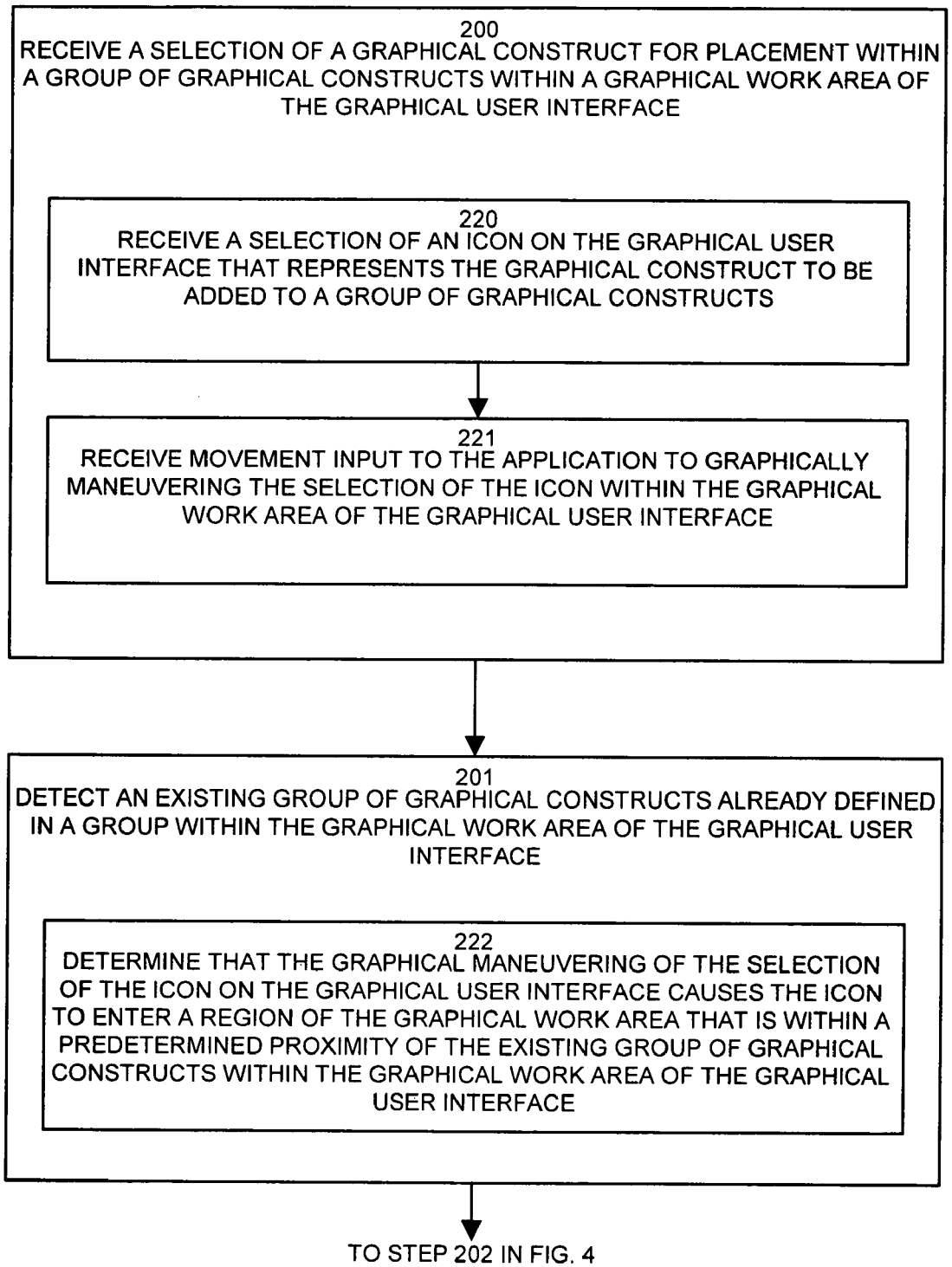
FIGS. 3 through 5 are a flow chart of processing steps that show details of processing operations to provide automatic groups of graphical constructs in accordance with example configurations of the invention.
Figure 4:
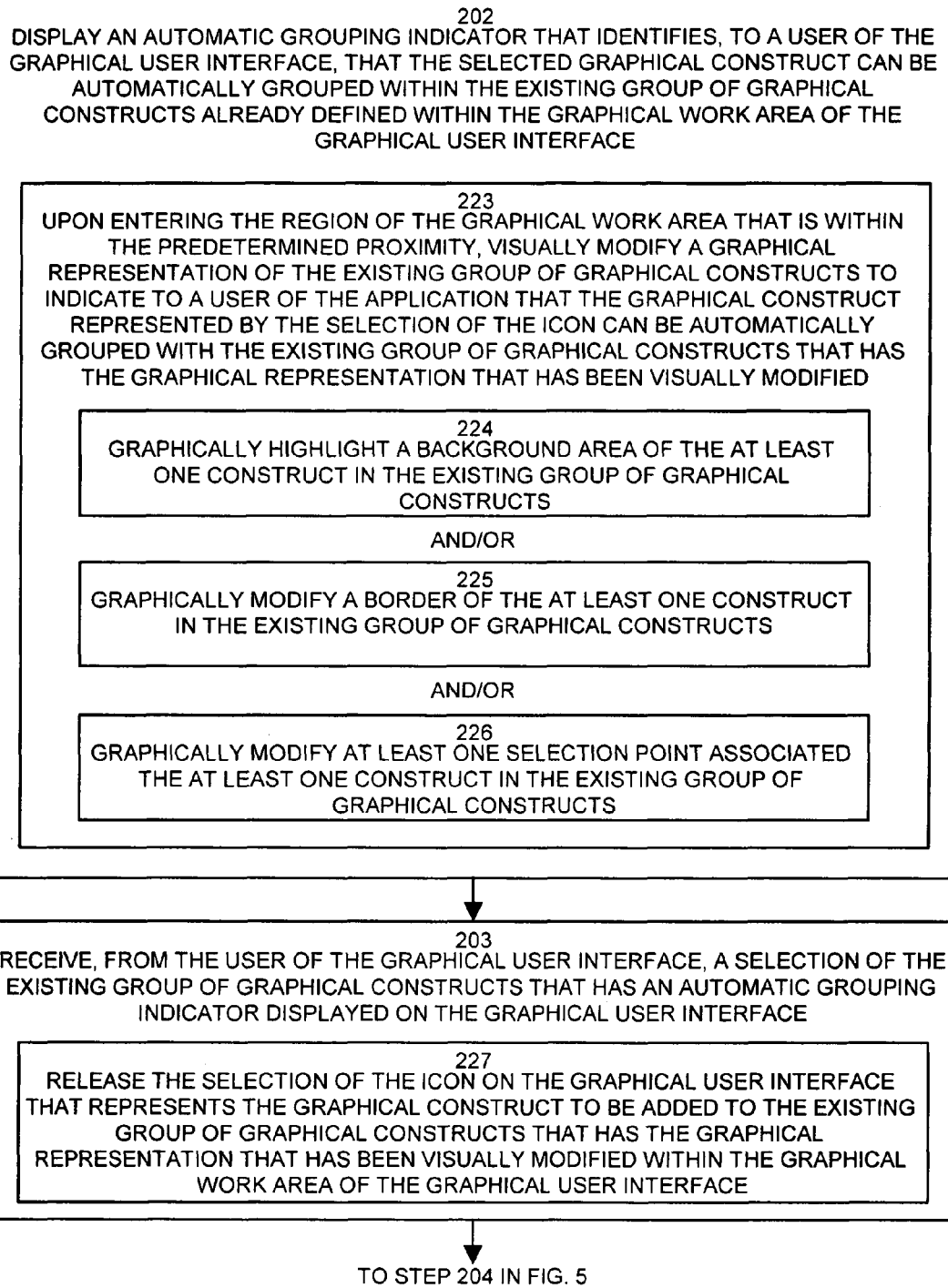
Figure 5:
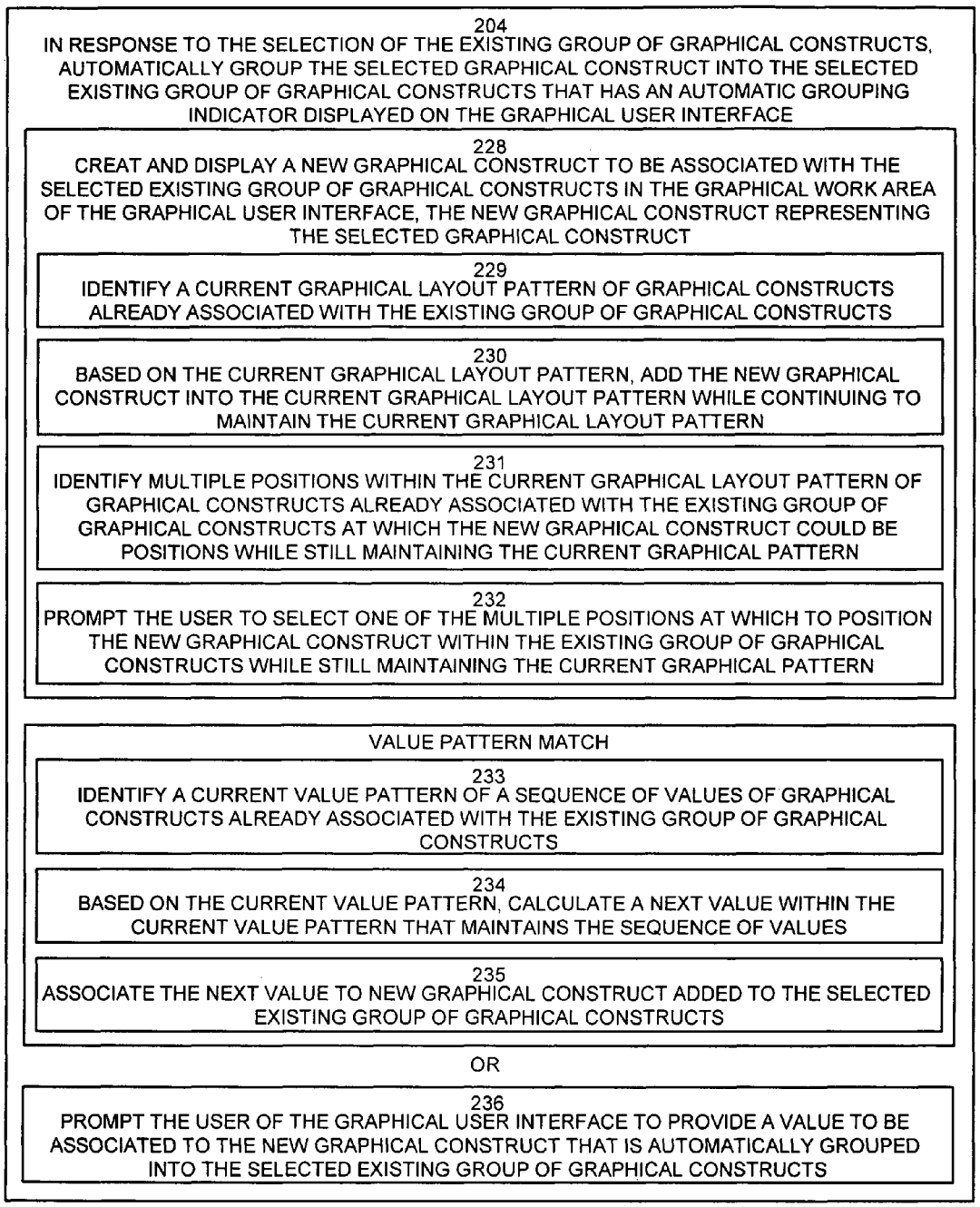

FIGS. 3 through 5 are a flow chart showing details of processing steps 200 through 204 (from FIG. 2) that the grouping process 150 performs for automatically grouping graphical constructs in the graphical user interface in accordance with example configurations. The processing steps 200 through 204 explained above are repeated in the flow chart below in FIGS. 3 through 5 to assist the reader in understanding how sub-steps shown in this flow chart support the overall processing shown by steps 200 through 204 as discussed above in various example configurations. It is to be understood that these configurations are shown by way of example only and are not intended to limit the scope of the invention to such exact example descriptions.

In FIG. 3, in step 200, the grouping process 150 receives a selection of a graphical construct 164 for placement within a group of graphical constructs 168 as explained above. Sub-steps 220 through 221 show details of this processing in one example configuration.

In step 220, the grouping process 150 receives a selection of an icon in the palette of constructs 162 on the graphical user interface 160 that represents the graphical construct 164 to be added to a group of graphical constructs 168. In one configuration, the graphical construct 164 is a radio button. It is to be understood that configurations as explained herein are applicable to any other type of graphical construct that might be arranged within a group or in any other type of relation to one or more existing graphical constructs that might already be present within the graphical work area 170. Thus while a radio button and grouping are used in these examples, configuration is of the invention are not limited to radio button graphical constructs being grouped.

In step 221, the grouping process 150 receives movement input to the application 140 to graphically maneuver the selection of the icon within the graphical work area 170 of the graphical user interface 160. This can include the user 108 dragging an icon that represents the graphical construct 164 from the palette 162 into the graphical work area 170 for placement within graphical user interface 166 that is currently under development as illustrated in FIG. 1 via the path or movement arrow 190. Note that the graphical user interface 166 represents any type of user creatable form, framework, container, document, web page or other entity that is being created by the development application and/or process 140 within the work area 170.

In step 201 as explained above, the grouping process 150 detects an existing group of graphical constructs (e.g., 168-2) already defined in a group within the graphical work area 170 of the graphical user interface. Sub-step 222 defines details of this processing in accordance with one example configuration.

In sub-step 222, the grouping process 150 determines that the graphical maneuvering (i.e., the movement) of the selection of the icon on the graphical user interface causes the moving icon 164 to enter a region of the graphical work area 170 that is within a predetermined proximity 192 of the existing group of graphical constructs 168 within the graphical work area 170 of the graphical user interface 160. The predetermined proximity 192 may be, for example, a certain distance, vector, range, pixel count (e.g., 25 pixels) or other measurement within which an automatic grouping indicator 175 should be displayed to the user 108 to indicate to the user that he or she is able to perform automatic grouping provided by the grouping process 150 to associate that selected graphical construct 164 with the existing group 168 that is within the predetermined proximity to the moving construct.

In one configuration, the grouping process 150 can be configured to continuously calculate the predetermined proximity of all groups 168 in order to identify the closest existing group 168 to the graphical construct 164 once a construct 164 has been selected by the user and dragged into the graphical work area 170. In other words, in this configuration there is always at least one existing group of graphical constructs 168 that is closer than other groups 168 to the selected graphical construct 164 and the processing in step 222 can continually determine the identity of the closest group. In one configuration, the predetermined proximity or distance can be preset by the user as a configuration parameter of the development application 140 to allow the user to set an automatic grouping sensitivity that indicates how close or how far the user must maneuver the graphical construct icon 164 within the graphical work area 170 in order for an automatic grouping indicator 175 to be displayed in association with a group 168 that comes within the predetermined range set by the user.

FIG. 4 continues the flow chart of processing steps from FIG. 3 and shows further details of processing that the grouping process 150 performs according to example configurations.

In FIG. 4, in step 202, the grouping process 150 graphically displays an automatic grouping indicator 175 in response to determining that the graphically maneuvered icon (i.e., the icon for the user selected graphical construct 164) has entered the region of the graphical work area 170 that is within the predetermined proximity of the existing group of graphical constructs 168. Sub-steps 223 through 226 show details of this processing.

In sub-step 223, upon entering the region of the graphical work area that is within the predetermined proximity (e.g., within 25 pixels of any existing group 168), the grouping process 150 visually modifies a graphical representation of the existing group of graphical constructs 168 (e.g., the highlighted border 175) to indicate to a user 108 of the application 140 that the graphical construct 164 represented by the selection of the icon can be automatically grouped with the existing group of graphical constructs 168 that has the graphical representation that has been visually modified. In this example, the visual modification that represents the automatic grouping indicator 175 is to highlight a border region of the group 168-2 that is presently closest to the user selected graphical construct 164-1. Thus, using the processing described herein, as the user maneuvers the icon 164 within the graphical work area 170 and as the icon passes within the predetermined proximity to each of the groups 168-1, 168-2 . . . 168-N, a border surrounding the closest group can be highlighted, displayed, flashed or otherwise visually modified to indicate to the user 108 that the nearby group 168 represents a group to which the icon being maneuvered by the user can be automatically added. Sub-steps 224 to 226 show alternative configurations for providing an automatic grouping indicator 175.

In sub-step 224, the grouping process 150 graphically highlights a background area of the at least one construct 164 in the existing group of graphical constructs 168.

This can include changing the color of the group or providing some other graphical effect.

In sub-step 225, the grouping process 150 graphically modifies a border of the at least one construct in the existing group of graphical constructs. Step 225 was illustrated in the example above and is shown in the example in FIG. 1. The border can be the entire perimeter of the group, or might be a border or edge or other indication of the closest construct within the group that is nearest the moving construct 164 that is to be added to the group.

In sub-step 226, the grouping process 150 graphically modifies at least one selection point associated the construct(s) in the existing group of graphical constructs. In the development application 140, graphical constructs 164 placed onto the graphical work area 170 may include one or more selection points allowing, for example, resizing or reshaping of that graphical construct 164. In step 226, such selection points can be displayed (typically they are not displayed when that construct is not currently selected), highlighted, flashed, vibrated or otherwise visually modified to indicate to the user the presence of a group of graphical constructs 168 to which the selected construct 164 can be automatically added.

In step 203, as explained above in FIG. 2, the grouping process 150 receives, from the user of the graphical user interface, a selection of an existing group of graphical constructs 168 that has an automatic grouping indicator displayed on the graphical user interface. Sub-step 227 defines details of this processing accordance with one example configuration.

In sub-step 227, the user 108 releases the selection of the icon on the graphical user interface 160 (e.g., in the work area 170) that represents the graphical construct 164 to be added to the existing group of graphical constructs 168-2 (in the illustrated example) that has the graphical representation that has been visually modified (i.e., the highlighted border in the illustrated example). In this manner, the user 108 releases the selection of the graphical constructs 164 by releasing a button on the mouse 116 to indicate to the grouping process 150 that he or she desires to have automatic grouping performed.

In an example alternative configuration, the user 108 is able to select a control or other selection or modifier key (e.g., a shift or function key) within a keyboard coupled to the computer system 110 in order to select the construct for copying to other (i.e., multiple) additional groups of graphical constructs 168 into which an instance of the selected graphical constructs 164 is to be added. In this manner, a user can select a single graphical construct 164 and can automatically add a copy or instance of this construct 164 into multiple selected pre-existing groups 168. In one example example, if the control key is pressed while a group is highlighted (e.g., 175), the automatic addition of the construct to that group occurs, and in addition the user is able copy the construct to other groups as well by continuing to maneuver the graphical construct 164 away from that group towards other groups within the graphical work area 170. The formerly highlight group will remain highlighted and will receive the construct, even though the user has moved the construct 164 beyond the predetermined proximity, due to the control key operation, to add the construct to still other groups. When the grouping process 150 highlights other groups 168 due to their proximity to the moving graphical construct 164, the user can again press the control key for each group that gets highlighted in order to include a second, third, or Nth group 168 into a group of groups for which that graphical construct is to be added. Once the construct selection is released using the input device 116, the automatic group of an instance of this construct into all selected groups can proceed. It is to be understood that this technique for placing a construct into several groups is given by way of example only and that there can be other ways that might use different modifier keys or mechanisms to allow a user to automatically place a construct into several groups 168.

FIG. 5 continues the flow chart of processing steps from FIG. 4 and shows further details of processing that the grouping process 150 performs according to example configurations.

In FIG. 5, in step 204, as explained above in FIG. 3, the grouping process 150 in response to the selection of the existing group of graphical constructs, automatically groups the selected graphical construct into the selected existing group(s) 168 of graphical constructs that has/have an automatic grouping indicator 175 displayed on the graphical user interface. This can be one of more groups 168 as explained above. Sub-steps 228 through 236 show details of this processing in accordance with one example configuration.

In step 228, the grouping process 150 creates and displays a new graphical construct to be associated with the selected existing group of graphical constructs 168 in the graphical work area 170 of the graphical user interface 160. The new graphical construct represents the selected graphical construct 164 that is now being automatically added to the selected group(s) 168. If more than one group 168 was selected, that a new construct can be displayed for each group. At this point, in one configuration the user can then manually position the added constructs at a desired location. Thus in a simple embodiment, the automatic grouping assigns that construct to the group and completes the association of that construct by assigning the existing group name to that construct. It is then up to the user to complete other information associated with that construct, such as its exact graphical position, as well as its display and returns values.

Sub-steps 229 through 231 relate to a more robust configuration that enables pattern matching for any graphical layout pattern that might presently exist within the selected existing group of graphical constructs 168 so that a user does not have to perform manual positioning of the construct. Other embodiments to be described shortly can include automatic value assignments as well.

In step 229, the grouping process 150 identifies a current graphical layout pattern of graphical constructs already associated with the existing group of graphical constructs 168. Such patterns can be, for example, a horizontal, vertical or other layout pattern expressed by the positioning of existing graphical constructs 164 within the selected existing group of graphical constructs 168 to which automatic grouping is applied. As an example, the spacing of graphical constructs such as radio buttons in an existing group 168 might be substantially equivalent to each other and in step 229, the grouping process 150 can detect this existing spacing pattern and can calculate the average or approximate pixel distance between the graphical constructs that are already members of the selected existing group of graphical constructs 168 to which automatic grouping is to be applied.

In step 230, based on the current graphical layout pattern, the grouping process 150 adds the new graphical construct into the current graphical layout pattern while continuing to maintain the current graphical layout pattern. Using the example above, if a sequence of radio buttons are horizontally arranged and are separated by approximately (or on average) 100 pixels each, in step 230 the grouping process 150 designates a position 100 pixels beyond the last construct in the group at which to render the new graphical construct 164. Thus the grouping process can calculate a position that is 100 pixels away from the last or most recently added radio button to the existing group 168. In this manner, a user 198 does not need to specifically specify the location of the graphical construct that is automatically added to the group, thus saving the user valuable graphical user interface development time. In some cases, there might be multiple positions or locations at which the grouping process 150 could automatically position the newly added graphical construct 164. This contingency is covered by the processing in sub-steps 231 and 232.

In sub-step 231, the grouping process 150 identifies multiple positions within the current graphical layout pattern of graphical constructs already associated with the existing group of graphical constructs 168 at which the new graphical construct 164 could be positioned while still maintaining the current graphical pattern. As an example, it might be that case that a radio button can be added at the beginning or at the end (or top or bottom) of a horizontally or vertically arranged existing group of graphical constructs 168.

In step 232, in response to step 231, the grouping process 150 prompts the user to select one of the multiple positions at which to position the new graphical construct within the existing group of graphical constructs while still maintaining the current graphical pattern. The grouping process 150 can thus request user input to indicate the user preference for a calculated position that matches the existing layout pattern. Alternatively, if multiple positions are available, the grouping process 150 can be configured to default to a position that is closest to the most recently added graphical construct within the existing group 168. Accordingly, if a user is creating a group of graphical constructs 168, as more and more constructs are added, for example, to the end location of the group 168, the grouping process 150 can use the location of the most recently added group to identify the next location for any future construct(s) to be added to that group 168 in an automated manner.

Sub-steps 233 through 235 describe another configuration that can perform value matching for value pattern recognition of graphical constructs such as radio buttons that return values when selected by user (i.e., during use of the graphical user interface 166 under development) or when displayed in the graphical user interface 166 such that a user does not have to specify a value (return value or display value or other value, such as tab order value) to be assigned to that radio button. As noted above, in a radio button configuration, the existing group of graphical constructs 168 is an existing group of at least one radio button construct and the selected graphical construct is a radio button to be associated with the existing group radio buttons. Each radio button construct within the existing group of graphical constructs has an associated value to be returned exclusively on behalf of the existing group of graphical constructs if selected by a user using the graphical user interface. The radio buttons might also have other associated data, parameters or values such as display values, tab order values, and the like. The grouping process can detect patterns to such values in existing constructs in the group 168 and can use these patterns to calculate new value and assigns such values to the appropriate fields or parameters of the newly added construct, thus further simplifying grouping for a user 108.

In step 233, the grouping process 150 identifies a current value pattern of a sequence of values associated with graphical constructs 164 already associated with the existing group of graphical constructs 168. Such values often have a predetermined numeric or alphanumeric or other sequence such as 1, 2, 3 . . . or A, B, C . . . or the like.

In step 234, based on the current value pattern, the grouping process 150 calculates a next value within the current value pattern that maintains the sequence of values. The grouping process 150 can perform this processing by identifying equivalent alphanumeric or numeric values existing between individual values assigned to the graphical constructs within the existing group 168.

In step 235, the grouping process 150 associates the calculated next value to the new graphical construct 164 added to the selected existing group of graphical constructs 168. In this configuration then, the user does not need to assign a specific value to the graphical construct such as a radio button if the radio buttons in the already existing group 168 have an identifiable sequence of values. As noted above, more than one value sequence can be identified and duplicated for the new construct in this manner.

In step 236, in an alternative configuration, the grouping process automatically groups the selected graphical construct into the selected existing group of graphical constructs and prompts the user of the graphical user interface 160 to provide a value to be associated to the new graphical construct, such as a radio button, that is automatically grouped into the selected existing group of graphical constructs 168. The processing in step 236 can either be performed by default to always prompt the user for a specific value to be assigned to the graphical construct that is automatically added to the group 168 or alternatively, step 236 can be performed in the event that the current value pattern in step 233 cannot be ascertained by the grouping process 150.

According to the aforementioned configurations, the system disclosed herein can provide significant performance benefits over conventional mechanisms and techniques for combining graphical constructs into a group within the graphical development application 140.

Figure 6:
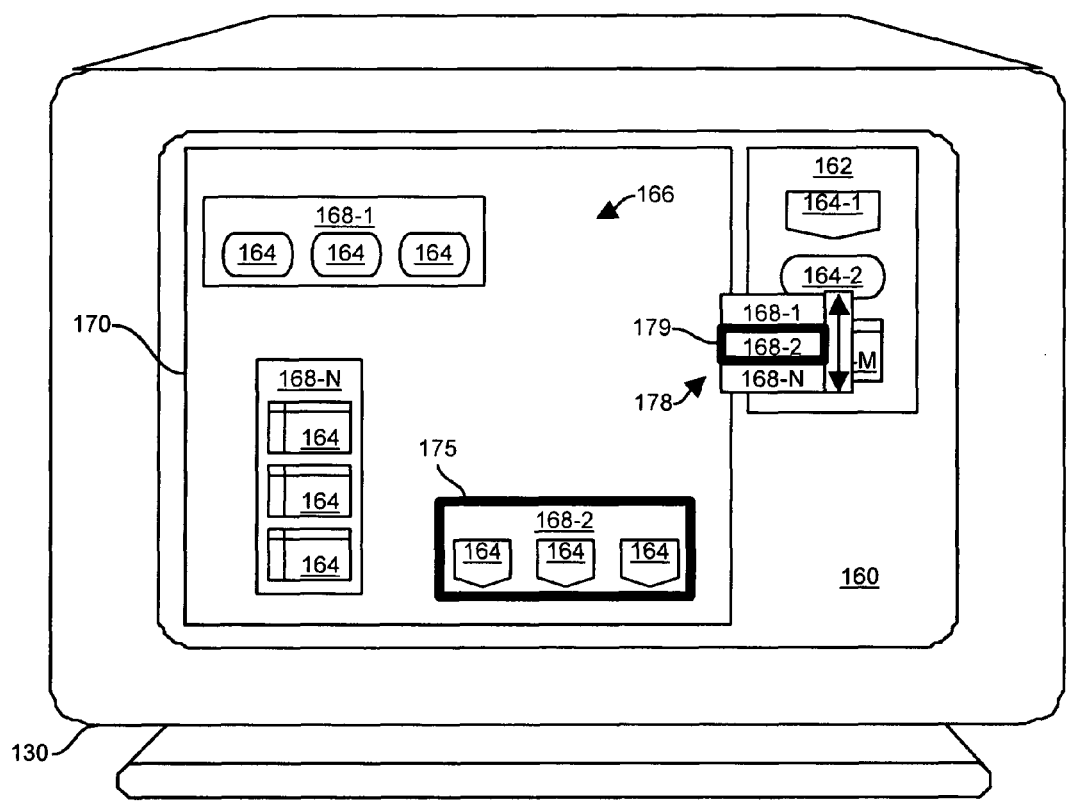
FIG. 6 illustrates a graphical user interface configured to operate in accordance with one example configuration of the invention.

FIG. 6 shows an alternative configuration of a graphical user interface that provides a different automatic grouping indicator that provides for automatic grouping of graphical constructs. In particular, in FIG. 7 the graphical user interface 160 includes the graphical work area 170 that supports the creation of groups of graphical constructs 168, as well as the palette selection area 162 that allows a user 108 to select graphical constructs 164 for placement within the graphical user interface 166 under development within the work area 170. This example configuration however illustrates the use of a list 178 of existing groups of graphical constructs 168 to which a user selected graphical constructs 164 can be added. In his configuration, the list 178 is a pull-down menu that the user 108 can invoke, for example, by right-clicking the mouse 116 on a construct (164-2 in the illustrated example). Once the list 178 is displayed, as will be explained below, the user is able to select one or more of the existing groups 168 into which the selected graphical constructs 164 is to be added. In the illustrated example, the automatic grouping indicator 175 is also shown surrounding the group 168-2 within the work area 170 and that group is selected by default within the pull-down menu list 178. This may be, for example, because the group 168-2 was the last group to which the user 108 added constructs 164. 175 Further details of this processing will now be provided with respect to the flow chart of processing steps shown in FIG. 7.

Figure 7:
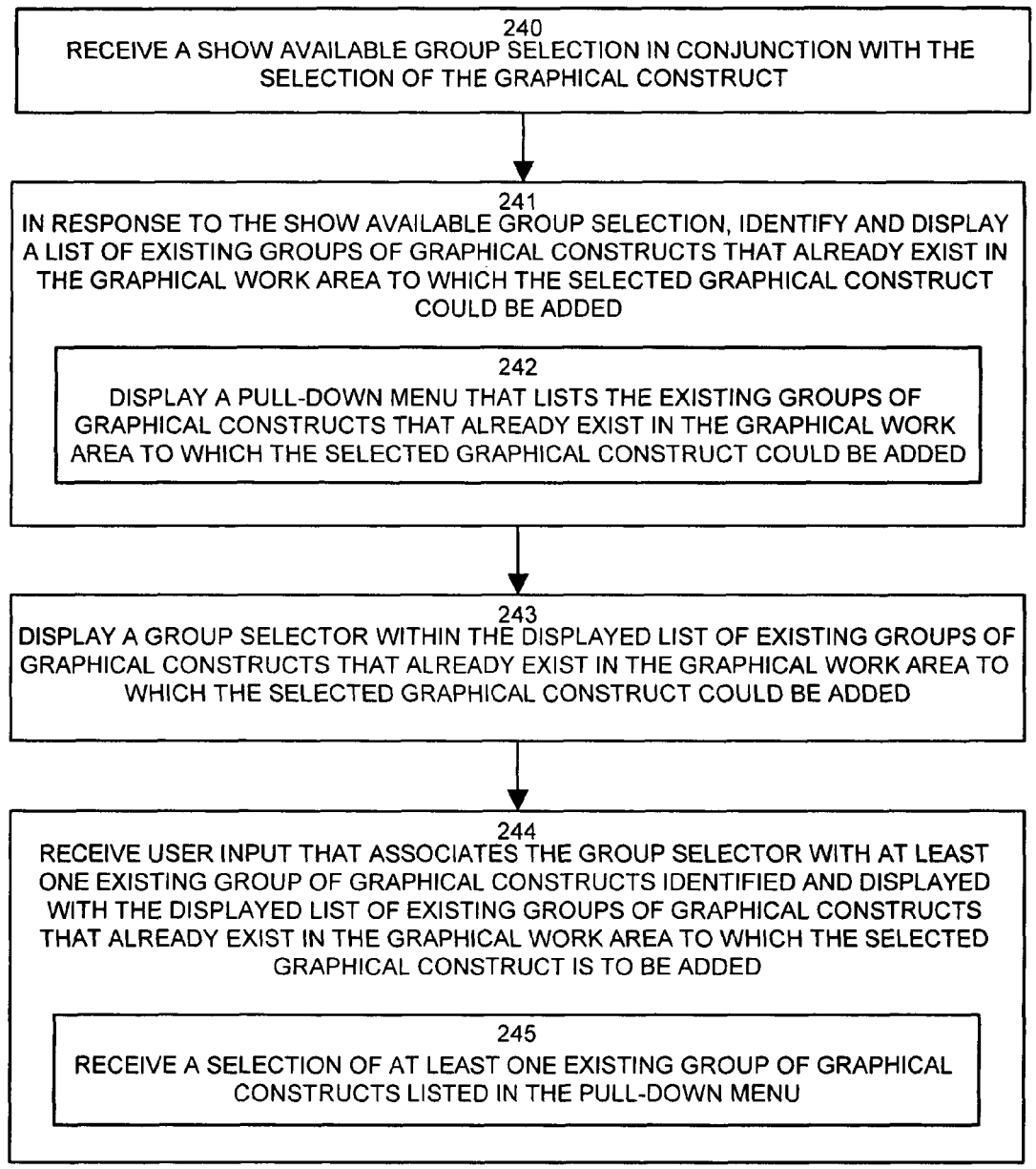
FIG. 7 is a flow chart of processing steps that a grouping process performs to display lists of available groups to a user in accordance with one example configuration.

FIG. 7 is a flow chart of processing steps that a configuration of the grouping process operating in an application that uses a graphical user interface performs for automatically grouping graphical constructs in the graphical user interface using lists such as pull-down menus in this example configuration.

In step 240, the grouping process 150 receives a show available group selection in conjunction with the selection of the graphical construct 164. The grouping process 150 can perform this as part of receiving the selection of a graphical construct 164 for placement within a group of graphical constructs within a graphical work area 170 of the graphical user interface. In other words, in the illustrated example the user 108 has selected a graphical construct 164-4 to be added to the graphical work area 170. In addition, the user 108 has provided a show available group selection, such as by right-clicking the mouse 116 over selected graphical construct 164-for within the palette 162 in order to cause the grouping process 150 to identify and display any available groups 168 to which that selected graphical construct 164-4 could be added. In an alternative configuration, the graphical construct 164 to be placed onto the work area 170 may or may not be already part of an existing group 168. In such cases, the user is able to right click the graphical construct 164 that already exists within the work area 170, in which case the grouping process 170 displays a pull down menu identifying all groups to which that construct could be added within the work area 170.

In step 241, in response to the show available group selection, the grouping process 150 identifies and displays a list of existing groups 168 of graphical constructs that already exist in the graphical work area 170 to which the selected graphical construct could be added.

In sub-step 242, the grouping process 150 displays a pull-down menu that lists the existing groups of graphical constructs 168-1, 168-2, . . . 168-N that already exist in the graphical work area 170 to which the selected graphical construct 164-4 could be added. Note that a pull-down menu is used in this configuration by way of example only and that other types of listing mechanisms can be used such as a scrolling list, text box, or the like.

In step 243, the grouping process 150 displays a group selector 179 within the displayed list 178 of existing groups of graphical constructs that already exist in the graphical work area to which the selected graphical construct could be added. In the illustrated example, the group selector 179 is a highlighted choice within the pull down menu. In one configuration, the group selector can be set to identify the most recent group 168 to which graphical constructs have most recently been added (i.e., the last group that was most recently selected by the user).

In step 244, the grouping process 150 receives user input that associates the group selector 179 with at least one existing group of graphical constructs 168 identified and displayed with the displayed list 178 of existing groups of graphical constructs that already exist in the graphical work area 170 to which the selected graphical construct 164-4 is to be automatically added.

In step 245, the grouping process 150 receives a selection of at least one existing group of graphical constructs listed in the pull-down menu. In this manner, the user 108 is able to provide a selection of the displayed pull down menu 178 that indicates to the grouping process 150 to which particular group 168 the graphical construct is to be added. The process of automatically adding that construct 164 to the selected group 168 as explained above (e.g., using pattern and value matching) can then be performed by the grouping process 150 to accomplish the process of automatically adding the selected construct to the selected group(s) 168.

While configurations of the system and method have been particularly shown and described with references to configurations thereof, it will be understood by those skilled in the art that various changes in form and details may be made therein without departing from the scope of the invention. As an example, the automatic grouping provided by the grouping process 150 as explained herein is not limited to simply placing graphical constructs within existing groups. Rather, automatic grouping as explained herein includes automatic creation (e.g., by copying) of relationships between existing graphical constructs for use by the newly added graphical construct in an automated manner such that the user is not required to perform all of the manual steps that would typically be required using a conventional application which forms relationships between multiple graphical constructs. As an example, constructs might be grouped to identify a display order in which they are to sequentially appear when the graphical user interface 166 is rendered in operation at runtime. Likewise, the invention is not limited to grouping of radio buttons but is instead intended to apply to any type of graphical constructs that can be grouped in order to share some relationship with each other. Accordingly, the present invention is not intended to be limited by the example configurations provided above.

What is claimed is:

1. In an application that uses a graphical user interface, a computer-implemented method for automatically grouping graphical constructs in the graphical user interface, the computer-implemented method comprising:

receiving a selection of a graphical construct for placement within a group of graphical constructs within a graphical work area of the graphical user interface;

detecting an existing group of graphical constructs defined within the graphical work area of the graphical user interface;

graphically displaying an automatic grouping indicator that identifies that the selected graphical construct can be automatically grouped within the existing group of graphical constructs within the graphical work area of the graphical user interface;

receiving a selection of the existing group of graphical constructs that has an automatic grouping indicator displayed on the graphical user interface;

in response to the selection of the existing group of graphical constructs, automatically grouping the selected graphical construct into the selected existing group of graphical constructs that has an automatic grouping indicator displayed on the graphical user interface;

wherein the existing group of graphical constructs is an existing group of at least one radio button construct and the selected graphical construct is a radio button construct to be associated with the existing group of at least one radio button construct;

wherein the graphical work area of the graphical user interface includes multiple groups of graphical constructs;

wherein the graphical user interface includes an electronic form under development for use in collecting information;

wherein each group of graphical constructs in the workspace indicates information to collect from the electronic form;

wherein detecting the existing group of graphical constructs defined within the graphical work area of the graphical user interface includes determining existing groups among the multiple groups of graphical constructs within the workspace to which the selected radio button construct can be added; and wherein automatically grouping the selected radio button construct into the selected existing group of graphical constructs that has an automatic grouping indicator displayed on the graphical user interface comprises:

creating and displaying a new radio button construct to be associated with the selected existing group of graphical constructs in the graphical work area of the graphical user interface, the new radio button construct representing the selected radio button construct.

2. The computer-implemented method of claim 1 wherein receiving a selection of a graphical construct for placement within a group of graphical constructs comprises:

receiving a selection of an icon on the graphical user interface that represents the graphical construct to be added to a group of graphical constructs; and receiving movement input to the application to graphically maneuvering the selection of the icon within the graphical work area of the graphical user interface;

wherein detecting an existing group of graphical constructs already defined in a group within the graphical work area of the graphical user interface comprises:

determining that the graphical maneuvering of the selection of the icon on the graphical user interface causes the icon to enter a region of the graphical work area that is within a predetermined proximity of the existing group of graphical constructs within the graphical work area of the graphical user interface; and wherein graphically displaying an automatic grouping indicator is performed in response to determining that the graphically maneuvered icon has entered the region of the graphical work area that is within the predetermined proximity of the existing group of graphical constructs and comprises:

upon entering the region of the graphical work area that is within the predetermined proximity, visually modifying a graphical representation of the existing group of graphical constructs to indicate that the graphical construct represented by the selection of the icon can be automatically grouped with the existing group of graphical constructs that has the graphical representation that has been visually modified.

3. The computer-implemented method of claim 2 wherein receiving a selection of the existing group of graphical constructs that has an automatic grouping indicator displayed on the graphical user interface comprises:

releasing the selection of the icon on the graphical user interface that represents the graphical construct to be added to the existing group of graphical constructs that has the graphical representation that has been visually modified within the graphical work area of the graphical user interface.

4. The computer-implemented method of claim 2 wherein visually modifying a graphical representation of the existing group of graphical constructs to indicate that the graphical construct represented by the selection of the icon can be automatically grouped with the existing group of graphical constructs comprises at least one of:

i) graphically highlighting a background area of the at least one construct in the existing group of graphical constructs;

ii) graphically modifying a border of the at least one construct in the existing group of graphical constructs; and iii) graphically modifying at least one selection point associated the at least one construct in the existing group of graphical constructs.

5. The computer-implemented method of claim 1 wherein automatically grouping the selected graphical construct into the selected existing group of graphical constructs that has an automatic grouping indicator displayed on the graphical user interface comprises:

creating and displaying a new graphical construct to be associated with the selected existing group of graphical constructs in the graphical work area of the graphical user interface, the new graphical construct representing the selected graphical construct.

6. The computer-implemented method of claim 5 wherein the existing group of graphical constructs is an existing group of at least one radio button construct and the selected graphical construct is a radio button to be associated with the existing group of at least one radio button, each radio button construct within the existing group of graphical constructs having an associated value to be returned exclusively on behalf of the existing group of graphical constructs if selected; and wherein automatically grouping the selected graphical construct into the selected existing group of graphical constructs comprises:

prompting to provide a value to be associated to the new graphical construct that is automatically grouped into the selected existing group of graphical constructs.

7. The computer-implemented method of claim 5 wherein creating and displaying a new graphical construct to be associated with the selected existing group of graphical constructs in the graphical work area of the graphical user interface comprises:

identifying a current graphical layout pattern of graphical constructs already associated with the existing group of graphical constructs;

based on the current graphical layout pattern, adding the new graphical construct into the current graphical layout pattern while continuing to maintain the current graphical layout pattern.

8. The computer-implemented method of claim 7 wherein adding the new graphical construct to the current graphical layout pattern while continuing to maintain the current graphical layout pattern comprises:

identifying multiple positions within the current graphical layout pattern of graphical constructs already associated with the existing group of graphical constructs at which the new graphical construct could be positioned while still maintaining the current graphical pattern, and in response, prompting to select one of the multiple positions at which to position the new graphical construct within the existing group of graphical constructs while still maintaining the current graphical pattern.

9. The computer-implemented method of claim 8 wherein creating and displaying a new graphical construct to be associated with the selected existing group of graphical constructs in the graphical work area of the graphical user interface comprises:

identifying a current value pattern of a sequence of values of graphical constructs already associated with the existing group of graphical constructs;

based on the current value pattern, calculating a next value within the current value pattern that maintains the sequence of values; and associating the next value to new graphical construct added to the selected existing group of graphical constructs.

10. The computer-implemented method of claim 5 wherein creating and displaying a new graphical construct to be associated with the selected existing group of graphical constructs in the graphical work area of the graphical user interface comprises:

identifying a current value pattern of values of graphical constructs already associated with the existing group of graphical constructs;

based on the current value pattern, calculating a next value within the current value pattern; and associating the next value to new graphical construct added to the selected existing group of graphical constructs.

11. The computer-implemented method of claim 5 wherein receiving a selection of a graphical construct for placement within a group of graphical constructs within a graphical work area of the graphical user interface comprises:

receiving a show available group selection in conjunction with the selection of the graphical construct; wherein detecting an existing group of graphical constructs already defined in a group within the graphical work area of the graphical user interface comprises:

in response to the show available group selection, identifying and displaying a list of existing groups of graphical constructs that already exist in the graphical work area to which the selected graphical construct could be added;

wherein graphically displaying an automatic grouping indicator that identifies that the selected graphical construct can be automatically grouped within the existing group of graphical constructs already defined within the graphical work area of the graphical user interface comprises:

displaying a group selector within the displayed list of existing groups of graphical constructs that already exist in the graphical work area to which the selected graphical construct could be added; and wherein receiving a selection of the existing group of graphical constructs that has an automatic grouping indicator displayed on the graphical user interface comprises:

receiving input that associates the group selector with at least one existing group of graphical constructs identified and displayed with the displayed list of existing groups of graphical constructs that already exist in the graphical work area to which the selected graphical construct is to be added.

12. The computer-implemented method of claim 11 wherein displaying a list of existing groups of graphical constructs that already exist in the graphical work area to which the selected graphical construct could be added comprises:

displaying a pull-down menu that lists the existing groups of graphical constructs that already exist in the graphical work area to which the selected graphical construct could be added; and wherein receiving input that associates the group selector with at least one existing group of graphical constructs comprises: receiving a selection of at least one existing group of graphical constructs listed in the pull-down menu.

13. The computer-implemented method of claim 1 wherein automatically grouping the selected graphical construct into the selected existing group of graphical constructs that has an automatic grouping indicator displayed on the graphical user interface comprises:

expanding the selected existing group of graphical constructs to include the selected graphical construct as a new member construct of the selected existing group of graphical constructs.

14. A computer system comprising:

a memory;

a processor;

a display;

an interconnection mechanism coupling the memory, the processor and the display allowing communication there between;

wherein the memory is encoded with a development application including a grouping process, the when executed in the processor, provides a development process including the grouping process that renders a graphical user interface on the display, the grouping process, when executed, providing automatic grouping of graphical constructs in the graphical user interface by causing the computer system to perform the operations of:
  receiving a selection of a graphical construct for placement within a group of graphical constructs within a graphical work area of the graphical user interface on the display;
  detecting an existing group of graphical constructs defined within the graphical work area of the graphical user interface on the display; and
  graphically displaying, on the display, an automatic grouping indicator that identifies that the selected graphical construct can be automatically grouped within the existing group of graphical constructs within the graphical work area of the graphical user interface;
  wherein the grouping process, when executed, causes the computer system to perform the operations of:
  receiving a selection of the existing group of graphical constructs that has an automatic grouping indicator displayed on the graphical user interface;
  in response to the selection of the existing group of graphical constructs, automatically grouping the selected graphical construct into the selected existing group of graphical constructs that has an automatic grouping indicator displayed on the graphical user interface;
  wherein the existing group of graphical constructs is an existing group of at least one radio button construct and the selected graphical construct is a radio button construct to be associated with the existing group of at least one radio button construct;
  wherein the graphical work area of the graphical user interface includes multiple groups of graphical constructs;
  wherein the graphical user interface includes an electronic form under development for use in collecting information;
  wherein each group of graphical constructs in the workspace indicates information to collect from the electronic form;
  wherein detecting the existing group of graphical constructs defined within the graphical work area of the graphical user interface includes determining existing groups among the multiple groups of graphical constructs within the workspace to which the selected radio button construct can be added; and
  wherein automatically grouping the selected radio button construct into the selected existing group of graphical constructs that has an automatic grouping indicator displayed on the graphical user interface comprises:
    creating and displaying a new radio button construct to be associated with the selected existing group of graphical constructs in the graphical work area of the graphical user interface, the new radio button construct representing the selected radio button construct.

15. The computer system of claim 14, further comprising:
  wherein when the grouping process causes the computer system to perform the operation of receiving a selection of a graphical construct for placement within a group of graphical constructs, the computer system performs the operations of:
  receiving a selection of an icon on the graphical user interface that represents the graphical construct to be added to a group of graphical constructs; and
  receiving movement input to the application to graphically maneuvering the selection of the icon within the graphical work area of the graphical user interface;
  wherein when the grouping process causes the computer system to perform the operation of detecting an existing group of graphical constructs already defined in a group within the graphical work area of the graphical user interface, the grouping process causes the computer system to perform the operation of:
    determining that the graphical maneuvering of the selection of the icon on the graphical user interface causes the icon to enter a region of the graphical work area that is within a predetermined proximity of the existing group of graphical constructs within the graphical work area of the graphical user interface; and
  wherein when the grouping process causes the computer system to perform the operation of graphically displaying an automatic grouping indicator, such operation is performed in response to determining that the graphically maneuvered icon has entered the region of the graphical work area that is within the predetermined proximity of the existing group of graphical constructs and causes the computer system to perform the operation of:
    upon entering the region of the graphical work area that is within the predetermined proximity, visually modifying a graphical representation of the existing group of graphical constructs on the display to indicate that the graphical construct represented by the selection of the icon can be automatically grouped with the existing group of graphical constructs that has the graphical representation that has been visually modified.

16. The computer system of claim 14, further comprising:
  wherein when the grouping process causes the computer system to perform the operation of receiving a selection of a graphical construct for placement within a group of graphical constructs within a graphical work area of the graphical user interface, the grouping process causes the computer system to perform the operation of:
  receiving a show available group selection in conjunction with the selection of the graphical construct;
  wherein when the grouping process causes the computer system to perform the operation of detecting an existing group of graphical constructs already defined in a group within the graphical work area of the graphical user interface, the grouping process causes the computer system to perform the operation of:
    in response to the show available group selection, identifying and displaying a list of existing groups of graphical constructs that already exist in the graphical work area to which the selected graphical construct could be added;
  wherein when the grouping process causes the computer system to perform the operation of graphically displaying an automatic grouping indicator that identifies that the selected graphical construct can be automatically grouped within the existing group of graphical constructs already defined within the graphical work area of the graphical user interface, the grouping process causes the computer system to perform the operation of:
    displaying a group selector within the displayed list of existing groups of graphical constructs that already exist in the graphical work area to which the selected graphical construct could be added; and
  wherein when the grouping process causes the computer system to perform the operation of receiving a selection of the existing group of graphical constructs that has an automatic grouping indicator displayed on the graphical user interface, the grouping process causes the computer system to perform the operation of:

receiving input that associates the group selector with at least one existing group of graphical constructs identified and displayed with the displayed list of existing groups of graphical constructs that already exist in the graphical work area to which the selected graphical construct is to be added.

17. A computer readable storage medium including computer program logic encoded thereon that represents an application including a grouping process, that, when executed on a computer system that provides a graphical user interface, causes the computer system to automatically group graphical constructs in the graphical user interface by performing the operations of:

receiving a selection of a graphical construct for placement within a group of graphical constructs within a graphical work area of the graphical user interface;

detecting an existing group of graphical constructs already defined in a group within the graphical work area of the graphical user interface;

graphically displaying an automatic grouping indicator that identifies that the selected graphical construct can be automatically grouped within the existing group of graphical constructs already defined within the graphical work area of the graphical user interface;

receiving a selection of the existing group of graphical constructs that has an automatic grouping indicator displayed on the graphical user interface;

in response to the selection of the existing group of graphical constructs, automatically grouping the selected graphical construct into the selected existing group of graphical constructs that has an automatic grouping indicator displayed on the graphical user interface;

wherein the existing group of graphical constructs is an existing group of at least one radio button construct and the selected graphical construct is a radio button construct to be associated with the existing group of at least one radio button construct;

wherein the graphical work area of the graphical user interface includes multiple groups of graphical constructs;

wherein the graphical user interface includes an electronic form under development for use in collecting information;

wherein each group of graphical constructs in the workspace indicates information to collect from the electronic form;

wherein detecting the existing group of graphical constructs defined within the graphical work area of the graphical user interface includes determining existing groups among the multiple groups of graphical constructs within the workspace to which the selected radio button construct can be added; and wherein automatically grouping the selected radio button construct into the selected existing group of graphical constructs that has an automatic grouping indicator displayed on the graphical user interface comprises:

creating and displaying a new radio button construct to be associated with the selected existing group of graphical constructs in the graphical work area of the graphical user interface, the new radio button construct representing the selected radio button construct.

18. The computer readable medium of claim 17, further comprising:

wherein the computer program logic that causes the computer system to perform the operation of receiving a selection of a graphical construct for placement within a group of graphical constructs, includes computer program logic that causes the computer system to perform the operations of:

receiving a selection of an icon on the graphical user interface that represents the graphical construct to be added to a group of graphical constructs; and receiving movement input to the application to graphically maneuvering the selection of the icon within the graphical work area of the graphical user interface;

wherein the computer program logic that causes the computer system to perform the operation of detecting an existing group of graphical constructs already defined in a group within the graphical work area of the graphical user interface includes computer program logic that causes the computer system to perform the operation of:

determining that the graphical maneuvering of the selection of the icon on the graphical user interface causes the icon to enter a region of the graphical work area that is within a predetermined proximity of the existing group of graphical constructs within the graphical work area of the graphical user interface; and wherein the computer program logic that causes the computer system to perform the operation of graphically displaying an automatic grouping indicator is performed in response to determining that the graphically maneuvered icon has entered the region of the graphical work area that is within the predetermined proximity of the existing group of graphical constructs and includes computer program logic that causes the computer system to perform the operation of:

upon entering the region of the graphical work area that is within the predetermined proximity, visually modifying a graphical representation of the existing group of graphical constructs to indicate that the graphical construct represented by the selection of the icon can be automatically grouped with the existing group of graphical constructs that has the graphical representation that has been visually modified.

19. The computer readable medium of claim 17, further comprising:

wherein the computer program logic that causes the computer system to perform the operation of receiving a selection of a graphical construct for placement within a group of graphical constructs within a graphical work area of the graphical user interface includes computer program logic that causes the computer system to perform the operation of:

receiving a show available group selection in conjunction with the selection of the graphical construct;

wherein the computer program logic that causes the computer system to perform the operation of detecting an existing group of graphical constructs already defined in a group within the graphical work area of the graphical user interface includes computer program logic that causes the computer system to perform the operation of:

in response to the show available group selection, identifying and displaying a list of existing groups of graphical constructs that already exist in the graphical work area to which the selected graphical construct could be added;

wherein the computer program logic that causes the computer system to perform the operation of graphically displaying an automatic grouping indicator that identifies that the selected graphical construct can be automatically grouped within the existing group of graphical constructs already defined within the graphical work area of the graphical user interface includes computer program logic that causes the computer system to perform the operation of:

displaying a group selector within the displayed list of existing groups of graphical constructs that already exist in the graphical work area to which the selected graphical construct could be added; and wherein the computer program logic that causes the computer system to perform the operation of receiving a selection of the existing group of graphical constructs that has an automatic grouping indicator displayed on the graphical user interface includes computer program logic that causes the computer system to perform the operation of:

receiving input that associates the group selector with at least one existing group of graphical constructs identified and displayed with the displayed list of existing groups of graphical constructs that already exist in the graphical work area to which the selected graphical construct is to be added.

20. The computer-implemented method claim 1, wherein automatically grouping the selected radio button construct into the selected existing group of graphical constructs that has an automatic grouping indicator displayed on the graphical user interface comprises:

automatically placing the radio button construct within the selected existing group while maintaining layout and value patterns of existing graphical constructs within the selected existing group;

wherein the selected existing group has a vertical or horizontal spacing of graphical constructs that conforms to an identifiable pattern;

detecting the identifiable pattern of vertical or horizontal spacing, and positioning the selected radio button construct as an additional graphical construct within the selected existing group while maintaining an approximate vertical or horizontal spacing layout existing within the selected existing group.

21. The computer-implemented method of claim 1, further comprising:

receiving movement input to the application to graphically maneuver the radio button construct within the graphical work area of the graphical user interface;

highlighting groups within a predetermined proximity of the radio button construct;

receiving a selection of multiple highlighted groups for placement of the radio button construct; and simultaneously copying the radio button construct into the selection of multiple highlighted groups within the graphical work area of the graphical user interface.

22. The computer-implemented method of claim 1, further comprising:

receiving a selection of a radio button construct within one of the existing groups of graphical constructs;

displaying a pull down menu that shows all groups of graphical constructs to which the selected radio button construct can be added within the graphical work area;

receiving a selection of one or more of the groups of graphical constructs displayed in the pull down menu; and adding the selected radio button construct to the one or more selected groups of graphical constructs.

23. The computer-implemented method of claim 1, wherein creating and displaying a new graphical construct to be associated with the selected existing group of graphical constructs in the graphical work area of the graphical user interface comprises:

identifying a current graphical layout pattern of graphical constructs already associated with the existing group of graphical constructs; and based on the current graphical layout pattern, adding the new graphical construct into the current graphical layout pattern while continuing to maintain the current graphical layout pattern;

wherein creating and displaying a new graphical construct to be associated with the selected existing group of graphical constructs in the graphical work area of the graphical user interface comprises:

identifying a current value pattern of values of graphical constructs already associated with the existing group of graphical constructs;

based on the current value pattern, calculating a next value within the current value pattern; and associating the next value to new graphical construct added to the selected existing group of graphical constructs;

wherein receiving a selection of a graphical construct for placement within a group of graphical constructs within a graphical work area of the graphical user interface comprises:

receiving a show available group selection in conjunction with the selection of the graphical construct; wherein detecting an existing group of graphical constructs already defined in a group within the graphical work area of the graphical user interface comprises:

in response to the show available group selection, identifying and displaying a list of existing groups of graphical constructs that already exist in the graphical work area to which the selected graphical construct could be added;

wherein graphically displaying an automatic grouping indicator that identifies that the selected graphical construct can be automatically grouped within the existing group of graphical constructs already defined within the graphical work area of the graphical user interface comprises:

displaying a group selector within the displayed list of existing groups of graphical constructs that already exist in the graphical work area to which the selected graphical construct could be added; and wherein receiving a selection of the existing group of graphical constructs that has an automatic grouping indicator displayed on the graphical user interface comprises:

receiving input that associates the group selector with at least one existing group of graphical constructs identified and displayed with the displayed list of existing groups of graphical constructs that already exist in the graphical work area to which the selected graphical construct is to be added.

\* \* \* \* \*